INVENTOR.
Stephen F. Wilson
BY
E. Archer Turner
ATTORNEY.

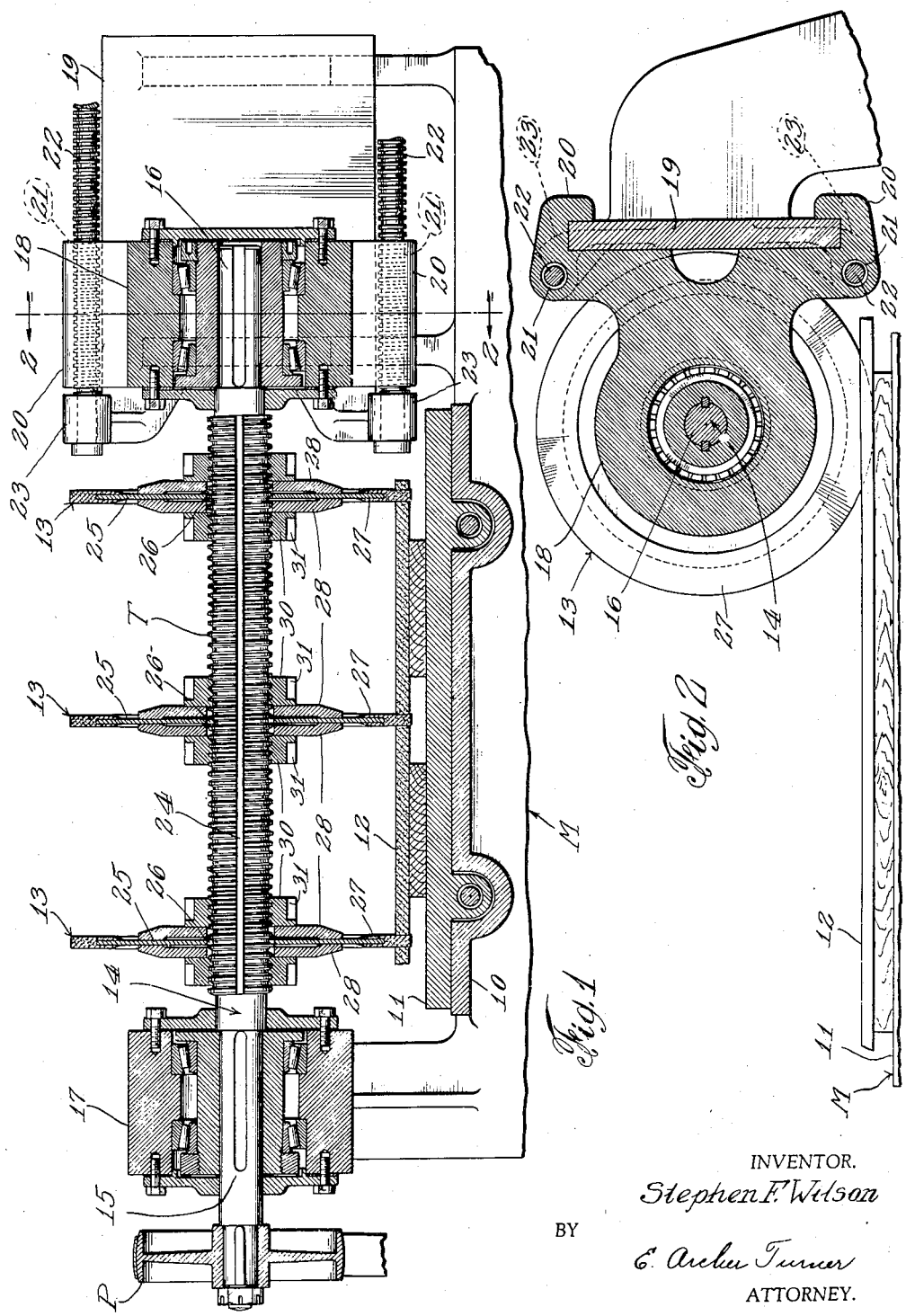

Patented Sept. 25, 1934

1,974,553

UNITED STATES PATENT OFFICE 1,974,553

MANDREL

Stephen F. Wilson, Cardiff, Md., assignor to Peyton du Pont, Incorporated, a corporation of Delaware Application January 13, 1934, Serial No. 706,448

4 Claims. (Cl. 51—168)

This invention relates to improvements in mandrels or arbors which are adapted to receive a plurality of cutting tools for rotation therewith.

Heretofore, when it was desired to mount a plurality of circular cutting tools on a mandrel, spacer bushings or sleeves were employed between the adjacent cutting tools for the purpose of spacing these tools apart the distance required. As a consequence, whenever a change in the spacing between any adjacent cutting tools was necessary, it was a costly and time consuming task to provide spacer bushings of the desired length.

It is the principal object of this invention to obviate these difficulties of past practices by providing an improved mandrel construction in which a portion of the mandrel is threaded, over which threaded portion a plurality of cutting tools may be mounted in operative relation by means arranged whereby any desired spacing between the several cutting tools may be quickly and easily attained.

Another object of this invention is the provision, in a device of the above described construction, of a pair of bearings for journaling the mandrel, at least one of such bearings being movable beyond the free end of the mandrel a distance sufficient to remove or install the desired cutting tools and the spacing and locking means therefor.

A more specific object of the invention resides in an improved mandrel construction consisting of a mandrel having a threaded portion which is provided with several keyways, a cutting disc passed freely over the threaded portion, a pair of cheek plates engaging the keyways of the threaded portion of the mandrel, there being one cheek plate on each side of the cutting disc and a threaded lock member at the side of each cheek plate remote from the cutting disc for firmly drawing up each cheek plate in contacting relation with the cutting disc.

Other objects such as the arrangement of the parts and their relation one with another will be apparent when the following specification is read in connection with the accompanying drawings, in which Figure 1 is a view of my improved mandrel with the associated parts thereof in axial section;

Figure 2 is a sectional view taken on the line 2—2 of Figure 1;

Figure 3:
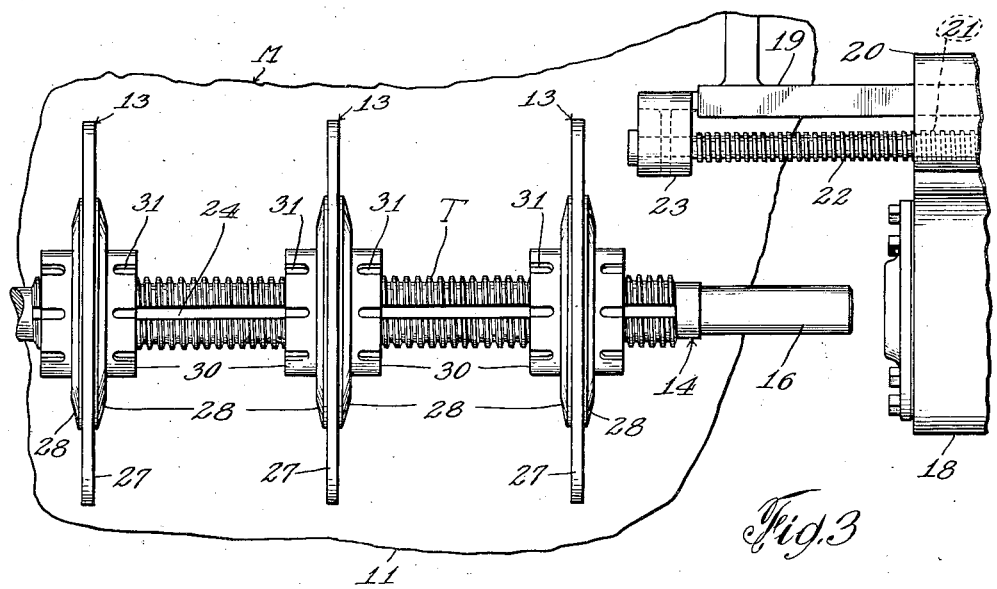
Figure 3 is a plan view of a portion of Figure 1 with one of the bearings for the threaded mandrel moved outwardly beyond the free end of the journal.

To illustrate one embodiment of my invention, I utilize a marble sawing machine M which includes a base plate 10 over which is mounted the table 11. The table 11 is movable longitudinally of the entire machine M and feeds marble slabs such as 12 at the desired rate of feed toward the circular cutters 13 which are operatively mounted on the mandrel or arbor 14 in a novel manner which will be fully described. A pulley P transmits power for rotating the mandrel.

The mandrel 14 is provided with journals 15 and 16 which are received in bearings 17 and 18 respectively. The bearing 17 is preferably in rigid position with reference to the sawing machine M while the bearing 18 is movable axially of the mandrel 14. Suitable means has been provided for movably mounting this bearing 18. In the present instance, a guide plate 19 is carried by the machine M. The bearing 18 is slidably mounted on this guide plate by means of engaging lugs 20. Each lug is threaded as at 21 to receive a lead screw 22, each of which in turn is journaled in a bearing such as 23 formed at one end of the guide plate 19. When the lead screws 22 are turned in unison by means of mechanism which is well known, the bearing 18, since it is restrained from rotation because of the lugs 20 engaging the guide plate 19, will slide along this plate in a direction axially of the mandrel as determined by the direction of rotation of the lead screws 22.

Between the journals 15 and 16, the mandrel is threaded as at T. The threads are preferably of "Acme" form and have a rather short lead or pitch. These threads are interrupted by a plurality of keyways 24 which are at least coextensive with the threaded portion of the mandrel.

Figures 4, 5:
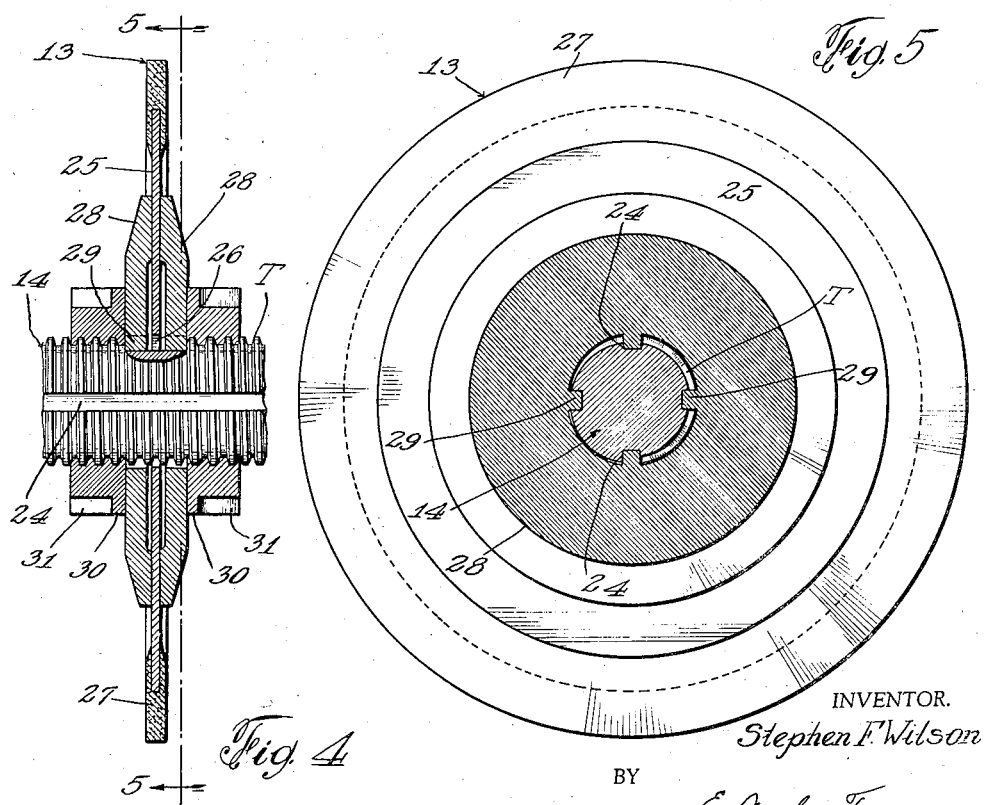
Figure 4 is an enlarged view of a portion of the threaded mandrel with the cutting disc and associated parts thereof in axial section.
Figure 5 is a sectional view taken on the line 5—5 of Figure 4.

Referring now particularly to Figures 4 and 5, it will be observed that each circular cutter 13 comprises a disc 25 having a central bore 26 which is slightly larger than the outer diameter of the threaded portion of the mandrel so that it may pass freely thereover. The cutting periphery 27 of the cutters is composed of abrasive material such as carborundum and is molded with the disc 25. At each side of the disc 25 there is a cheek plate 28 provided with teeth or keys such as 29 which interfit with the keyways 24 of the threaded mandrel for rotation therewith. In order to firmly lock the circular cutter 13 in the desired position on the threaded mandrel, a threaded nut member 30 is positioned adjacent each cheek plate 28 remote from the disc 25. Each nut member 30 is splined as at 31 so that a spanner wrench may be used for advancing each nut member toward its respective cheek plate.

Since the lead or pitch of the "Acme" screw thread is relatively short, it is possible to draw up each thread nut member 30 with the least effort. In the actual embodiment of this invention it has been found that the pressure of the cheek plates 28 against the disc 25 is sufficient to cause this disc to rotate with the threaded mandrel without slipping. Under other conditions of service it may be found advisable to key the disc 25 to a cheek plate 28.

Whenever it is necessary to remove certain of the circular cutters or to apply additional ones, the bearing 18 can be moved along the guide plate 19 to a position beyond the journal 16, as shown in Figure 3. With the bearing 18 in this position, the circular cutters 13, the cheek plates 28 and the nut members 30 can be removed or applied, as conditions may warrant, with a minimum expenditure of time. It will also be apparent to those versed in the art, that the use of a threaded mandrel and associated parts, permits of infinite adjustment between the circular cutters; such adjustment being far cheaper and more accurate than that attained by the use of spacer bushings or sleeves.

While my invention has been described in connection with its actual use in a marble sawing device, the principles of my mandrel construction are adaptable for widespread use as contemplated by the following claims.

I claim:

1. The combination including a mandrel provided with a threaded portion and a keyway extending from one end of the threaded portion to the other end thereof, a cutting tool passing freely over the threaded portion, a pair of cheek plates, one at each side of the cutting tool, each cheek plate having a key for engaging the keyway of the mandrel, and a threaded nut member engaging the threaded portion of the mandrel adjacent the side of each cheek plate remote from the cutting tool.

2. The combination including a mandrel provided with a threaded portion and a keyway extending from one end of the threaded portion to the other end thereof, a cutting tool including a disc having a central bore fitting freely over the threaded portion, a pair of cheek plates, one at each side of the disc, each cheek plate having a key for engaging the keyway of the mandrel, and a threaded nut member engaging the threaded portion of the mandrel adjacent the side of each cheek plate remote from said disc.

3. The combination including a mandrel provided with a pair of journals, a bearing for each journal, at least one of said bearings being movable beyond the free end of a journal, said mandrel having a threaded portion intermediate said journals and having a keyway extending from one end of the threaded portion to the other end thereof, a cutting tool passing freely over the threaded portion, a pair of cheek plates, one at each side of the cutting tool, each cheek plate having a key for engaging the keyway of the mandrel, and a threaded nut member engaging the threaded portion of the mandrel adjacent the side of each cheek plate remote from the cutting tool.

4. The combination including a mandrel provided with a pair of journals, a bearing for each journal, at least one of said bearings being movable beyond the free end of a journal, said mandrel having a threaded portion intermediate said journals and having a keyway extending from one end of the threaded portion to the other end thereof, a cutting tool including a disc having a central bore fitting freely over the threaded portion, a pair of cheek plates, one at each side of the disc, each cheek plate having a key for engaging the keyway of the mandrel, and a threaded nut member engaging the threaded portion of the mandrel adjacent the side of each cheek plate remote from said disc.

STEPHEN F. WILSON.